United States Patent [19]

Stoneburner

[11] Patent Number: 5,215,656
[45] Date of Patent: Jun. 1, 1993

[54] ROTARY SELF-CLEANING STRAINER

[75] Inventor: James O. Stoneburner, Ann Arbor, Mich.

[73] Assignee: Perfection Sprinkler Co., Ann Arbor, Mich.

[21] Appl. No.: 716,794

[22] Filed: Jun. 18, 1991

[51] Int. Cl.⁵ .......................................... B01D 33/067
[52] U.S. Cl. ................................. 210/170; 210/393; 210/394; 210/412; 210/416.1; 210/460; 210/499
[58] Field of Search ............... 210/167, 170, 304, 357, 210/359, 393, 394, 409, 411, 412, 416.1, 416.2, 437, 457, 459, 460, 461, 463, 499

[56] References Cited

U.S. PATENT DOCUMENTS

| | | | |
|---|---|---|---|
| 2,857,053 | 10/1958 | Schmiedel | 210/211 |
| 3,275,150 | 9/1966 | Tait | 210/394 |
| 3,882,025 | 5/1975 | Talley, Jr. | 210/354 |
| 4,599,172 | 7/1986 | Gardes | 210/409 |
| 4,610,786 | 9/1986 | Pearson | 210/412 |
| 4,822,486 | 4/1989 | Wilkins | 210/412 |

*Primary Examiner*—Robert A. Dawson
*Assistant Examiner*—W. L. Millard
*Attorney, Agent, or Firm*—George L. Boller

[57] ABSTRACT

A strainer that is used in association with a motor-driven pump that sucks water out of outdoor pits, reservoirs, streams, ponds, and the like, usually for irrigation or watering purposes. The strainer has a cylindrical screen disposed on a spool-like body for rotation substantially about its own axis. Nozzles that are disposed interiorly of the screen spray water outwardly through the screen to both rotate the screen and to dislodge any debris that may have accumulated on it due to the pump suction force. The screen is a plastic that has a specific gravity of approximately one and it is guided for rotation by the margins of circular discs that form the axial ends of the spool-like body.

22 Claims, 5 Drawing Sheets

ROTARY SELF-CLEANING STRAINER

FIELD OF THE INVENTION

This invention relates generally to strainers that are used in association with motor-driven pumps which suck water out of outdoor pits, reservoirs, streams, ponds, and the like, usually for irrigation or watering purposes. More specifically, the invention relates to a new and unique strainer of the rotary self-cleaning type which is adapted to be immersed in a body of debris-containing water to be pumped and whose purpose is to prevent debris, such as leaves, sticks, discarded plastic and paper articles, stones, etc., from being sucked into the pump.

BACKGROUND AND SUMMARY OF THE INVENTION

A rotary self-cleaning strainer is typically attached to one end of a conduit whose other end is attached to the suction side of the pump. When the pump is operated, water is drawn through the strainer's screen while the screen prevents certain debris, such as that just mentioned, from entering the pump where it might otherwise possibly impair or even damage the pump. It is a typical practice to rotatably mount the screen on the body of the strainer and to situate interiorly of the screen a number of nozzles that are supplied with pressurized water, such as from a separate return line tapped into the pump's pressure side. These nozzles are aimed to direct water outwardly through the screen for the purpose of dislodging debris that has adhered to the screen's exterior due to the suction force of the pump acting through the strainer. The reaction of the screen to the force of the impinging water from the nozzles may be self-sufficient to rotate the screen without the use of an additional device such as a turbine. An example of a strainer having such nozzles effective to both rotate and clean the screen is illustrated in the commonly assigned U.S. Pat. No. 4,822,486, one of whose joint inventors is the present inventor.

While both the strainer of U.S. Pat. No. 4,822,486 and that of the present invention possess a cylindrical screen that is both rotated and cleaned by the impinging water from nozzles situated interiorly of the screen, the strainer of this invention differs from the patented one in that this new strainer is particularly suited for use with relatively small pumps, whereas that of the patent is intended principally for larger commercial applications. One of the motivations for the present invention is the recognition that there are many applications, typically private and non-commercial, where smaller pumps can be used to draw water from a natural body of water, yet previous rotary self-cleaning strainers would be too large and/or costly for such use or even incapable of being operated with the available pressurized water that can be returned to them. For example, an individual who owns waterfront property may be permitted to pump water from the adjacent body for watering a lawn or garden. A small pump that can suck water out of that adjacent body would be ideally suited for that purpose, but because the water contains debris like that mentioned earlier, such a pump cannot be reliable unless a means is provided to assure that such debris will not inhibit the effectiveness of the pump. The present invention is directed to a strainer that is ideally suited for such a purpose in a very cost-effective manner.

Briefly the present invention comprises a cylindrical screen that is disposed on a spool-like body structure for rotation thereon substantially about its own axis. Nozzles are disposed on the spool-like body structure interiorly of the screen and are connected to a source of pressurized liquid, typically pressurized water, which can for example be obtained from a tap at the pressure side of the pump. The nozzles are aimed toward the screen both to rotate the screen and to dislodge accumulated debris from the screen's exterior as the screen rotates. The spool-like body structure comprises a pair of discs that close the opposite axial ends of the screen. Each disc has an annular margin that coacts with the annular margin of the corresponding axial end of the screen, and the coactions of the discs with the screen are such that the screen is guided for rotation substantially about its own axis with a slight amount of axial and radial play that avoids binding of the screen between the two discs while maintaining sufficient disc/screen sealing to guard against unacceptable intrusion of debris between the coacting margins of the discs and screen. In this way, the use of separate devices, such as rollers or wheels, for guidance of the rotating screen on the strainer body is unnecessary, thereby saving on the size of the strainer and on the amount of labor and materials required to fabricate such a strainer. Moreover, the screen itself can be simply a length of perforated plastic strip of suitable width and thickness that is curled into a circular shape. Accordingly, a strainer embodying the inventive principles can be fabricated in an economical fashion thereby making such a device especially attractive to the consumer market, although it should be understood that commercial uses of the present invention are not precluded.

An attribute that is important in securing an acceptable construction for many uses of the invention involves a particular characteristic of the filter screen itself. This characteristic is the specific gravity of the filter screen. It has been found especially beneficial to make the filter screen of a material whose specific gravity is approximately that of water; in other words, the material of the filter screen is approximately neutrally buoyant in water. Such a physical characteristic is believed to enhance the performance of the strainer because it tends to make the screen somewhat self-centering between the closure discs when immersed in water and rotated. Such a tendency appears beneficial in minimizing screen/disc resistance as the screen rotates while protecting against unacceptable intrusion of debris at the interfaces between the margins of the screen and the discs.

As will be seen from the ensuing detailed description of a presently preferred embodiment of the invention, there are additional features, advantages, and benefits of the invention. Drawings accompany this disclosure and illustrate the best mode contemplated at the present time for carrying out the invention.

DESCRIPTION OF THE PREFERRED EMBODIMENT

Figure 1:
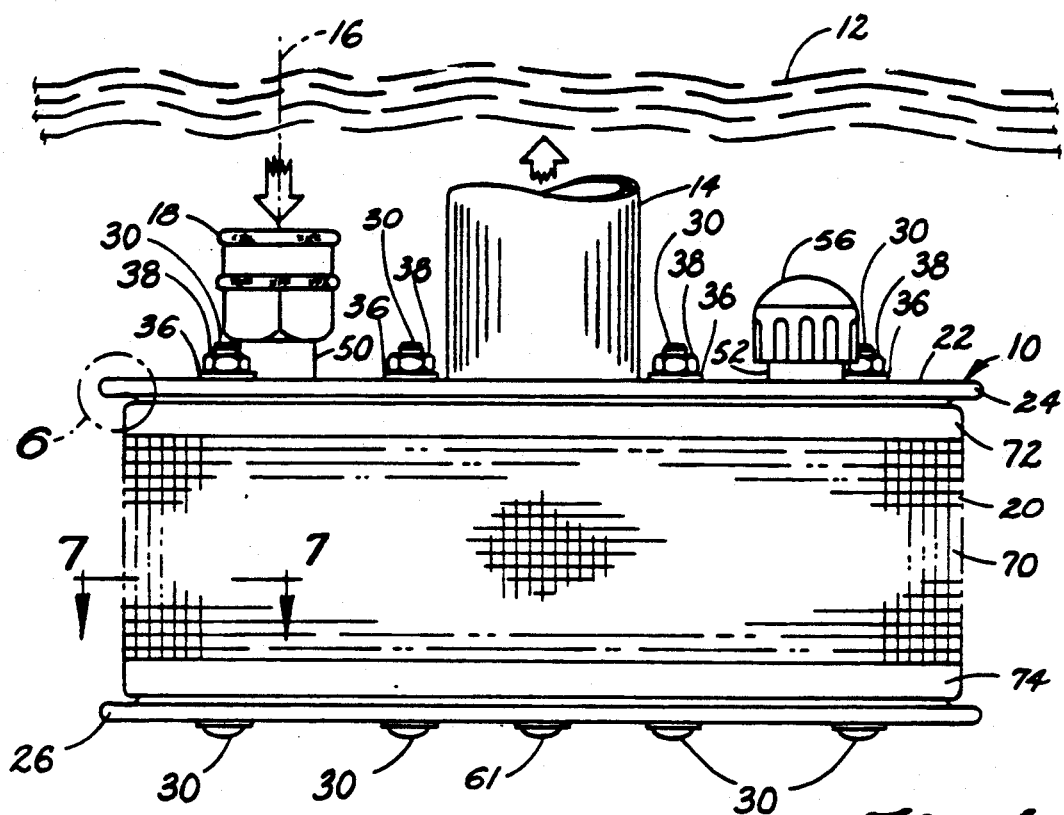
FIG. 1 is an elevational view of a strainer embodying principles of the invention, including a schematic portrayal of a representative use.

FIG. 1 presents a single rotary self-cleaning strainer 10 embodying the inventive principles in an illustrative usage submerged by its own weight in a body of debris-containing water 12 that is to be pumped. A pipe 14 is attached coaxially to strainer 10 and forms a portion of a conduit leading to the suction side of a motor-driven pump (not shown) that sucks water from the body of debris-containing water 12 through the strainer and conduit. One end of a hose 16, schematically portrayed, is attached to a fitting 18 on strainer 10, and the hose serves to convey pressurized water from a pressure source (not shown) to strainer 10 for rotating and cleaning a cylindrical screen 20 of the strainer.

Figure 2:
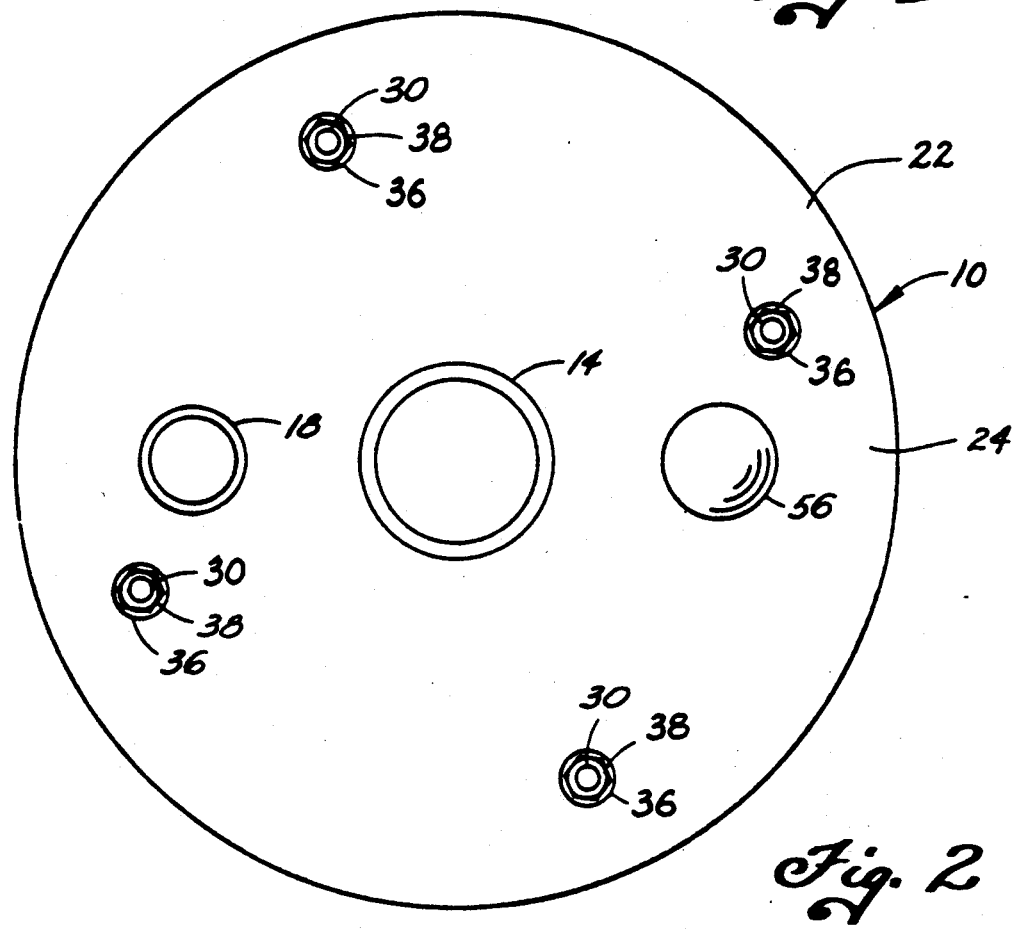
FIG. 2 is a top plan view of FIG. 1.
Figure 3:
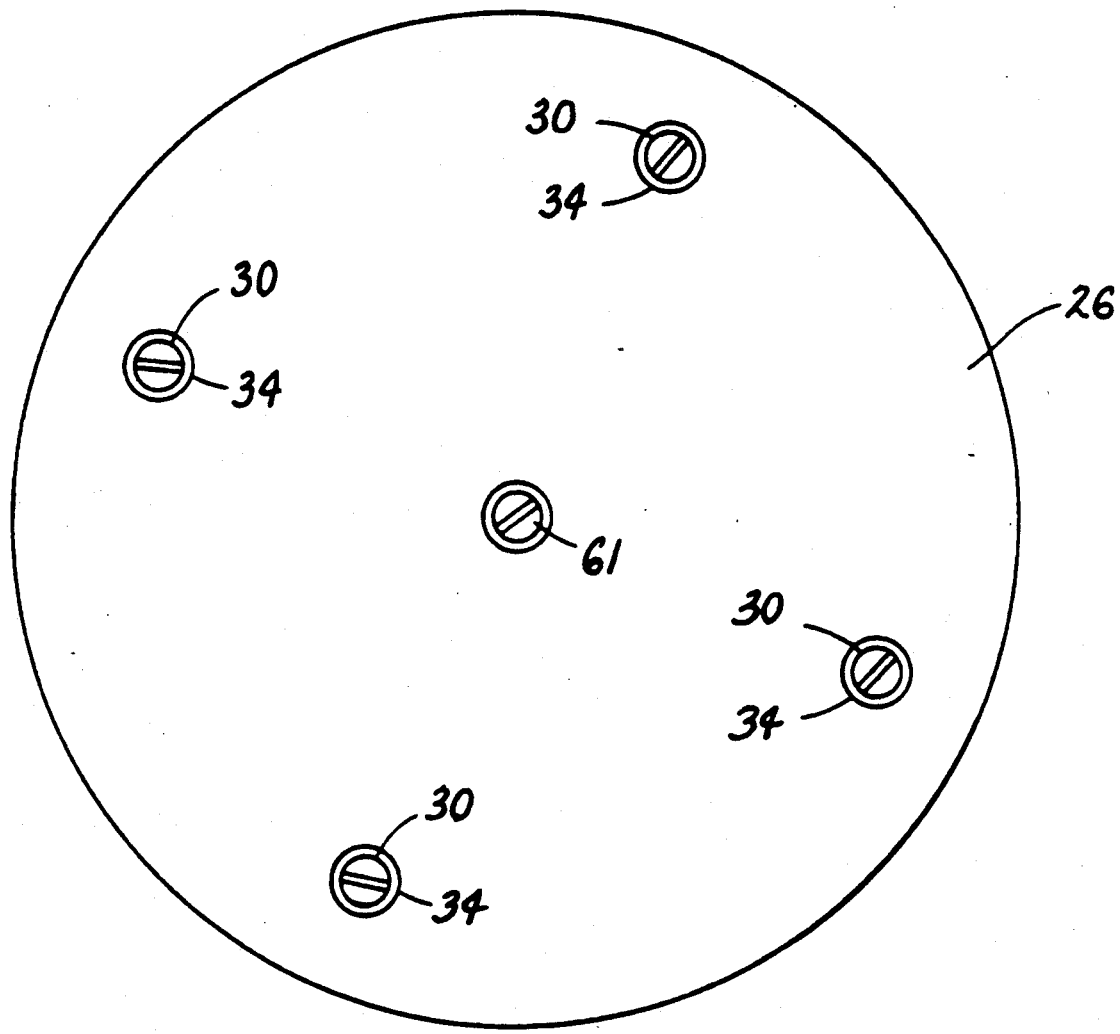
FIG. 3 is a bottom plan view of FIG. 1.
Figure 4:
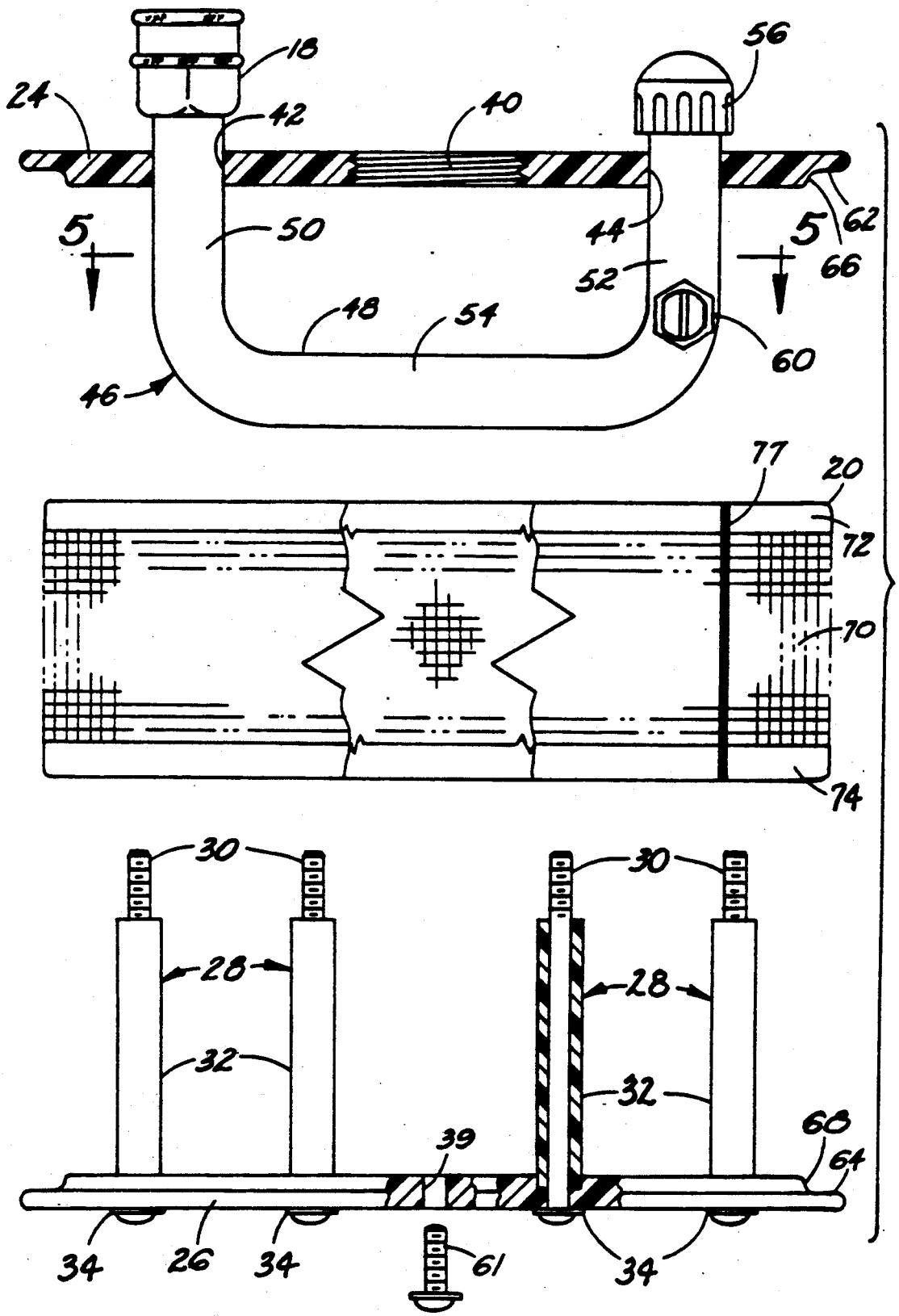
FIG. 4 is an exploded elevational view of FIG. 1 with certain portions having been broken away for illustrative purposes.

Screen 20 is arranged generally coaxially on a spool-like body 22 of the strainer. Body 22 comprises a pair of circular discs 24 and 26 that close respective opposite axial ends of screen 20. Preferably the discs are high density polyethylene. Further details of the strainer can be seen by also referring to FIGS. 2–4 as well, and from those FIGS. one can understand that the two discs 24 and 26 are joined in assembly to axially capture screen 20 between themselves through the use of four parallel tie rod structures 28 arranged ninety degrees apart from each other on a common circle that is concentric with the axis of the strainer and that has a diameter less than that of the screen. The tie rod structures hold the two discs in spaced apart parallel relationship perpendicular to the strainer's axis.

Each tie rod structure 28 comprises a headed fastener 30 that is disposed parallel to the strainer axis and whose shank passes through aligned holes in the respective discs 24 and 26. Each fastener shank also passes through a corresponding cylindrical spacer tube 32 whose opposite ends bear against the inside faces of the respective discs. A washer 34 is disposed between the head of each fastener 30 and the outside face of disc 26, and another washer 36 is disposed between the outside face of disc 24 and a nut 38 that has been threaded onto the distal end of the shank of the corresponding fastener 30. Preferably, the holes in the discs that are associated with the tie rod structures include counterbores for seating of the ends of the spacer tubes. Each nut 38 is tightened onto the corresponding fastener 30 to force the discs against the ends of spacer tubes 32. Desirably, the washers are lock-washers that aid in securing the parts in their assembled relationship. Preferably the nuts, washers, and fasteners are fabricated from stainless steel to resist the effects of water immersion. Tubes 32 are a suitable plastic, such as PVC tubing.

Except for the four holes that are associated with tie rod structures 28, and a small circular hole 39 at its center, disc 26 is imperforate. The purpose of hole 39 will be described later. Disc 24 includes three additional holes beyond the four that are associated with the tie rod structures. These three additional holes are a larger circular threaded hole 40 that is coaxial with the strainer's axis, and two smaller circular holes 42 and 44 that are spaced equidistant radially outwardly from hole 40 on a common diameter of the disc. Hole 40 is threaded so that pipe 14 can be threaded into it and tightened. Holes 42 and 44 are situated and dimensioned to accept a U-shaped tube and nozzle assembly 46.

Assembly 46 comprises a U-shaped tube 48 that has two axial segments 50 and 52 between which extends a diametral segment 54. The free end portions of segments 50 and 52 pass through and are fitted to holes 42 and 44 in a sealed manner to dispose segment 54 interiorly of screen 20. The terminations of the free end portions of segments 50 and 52 are disposed on the exterior of the strainer, and connector 18 is attached to the termination of segment 50. A closure cap 56 is attached to the termination of segment 52. Tube 48 is also a suitable plastic such as PVC.

Assembly 46 further comprises a pair of nozzles 58 and 60. Nozzle 58 is threaded into a tapped hole in segment 50 of tube 48 that is just slightly above the curved bend in the tube that joins segments 50 and 54; nozzle 60 is threaded into a tapped hole in segment 52 of tube 4 that is just slightly above the curved bend in the tube that joins segments 52 and 54. Both nozzles are aimed toward screen 20, the two nozzles pointing along parallel axes, but in opposite directions along each. As referenced along the axis of the strainer, each nozzle is approximately at the midpoint of screen 20. In the exemplary embodiment of the invention, which will be described in greater dimensional detail hereinafter, a preferred geometric relationship between nozzles 58, 60 and screen 20 has been discovered. Specifically, it is preferred that the angle "A" between the axis of a nozzle and a tangent to the screen at the location where the extension of a nozzle's axis intersects the screen be substantially forty-eight to fifty degrees, and that the distance "B" from the end of a nozzle to the screen, as measured along the extension be substantially two inches.

Nozzles 58, 60 are also preferably co-polymers. An example of such a nozzle is an acetal co-polymer, such as the PF series of Bete Fog Nozzle, Inc. In order to aid in securing assembly 46 on body 22 a screw 61 may be passed, shank first, through hole 39 and threaded into a tapped hole in the wall of the diametral section 54 of tube 48. Fitting 18 comprises a female coupling that provides for a complementary male coupling such as that found at the end of a conventional garden hose to be screwed into the fitting to form a leak-tight joint.

Figure 5:
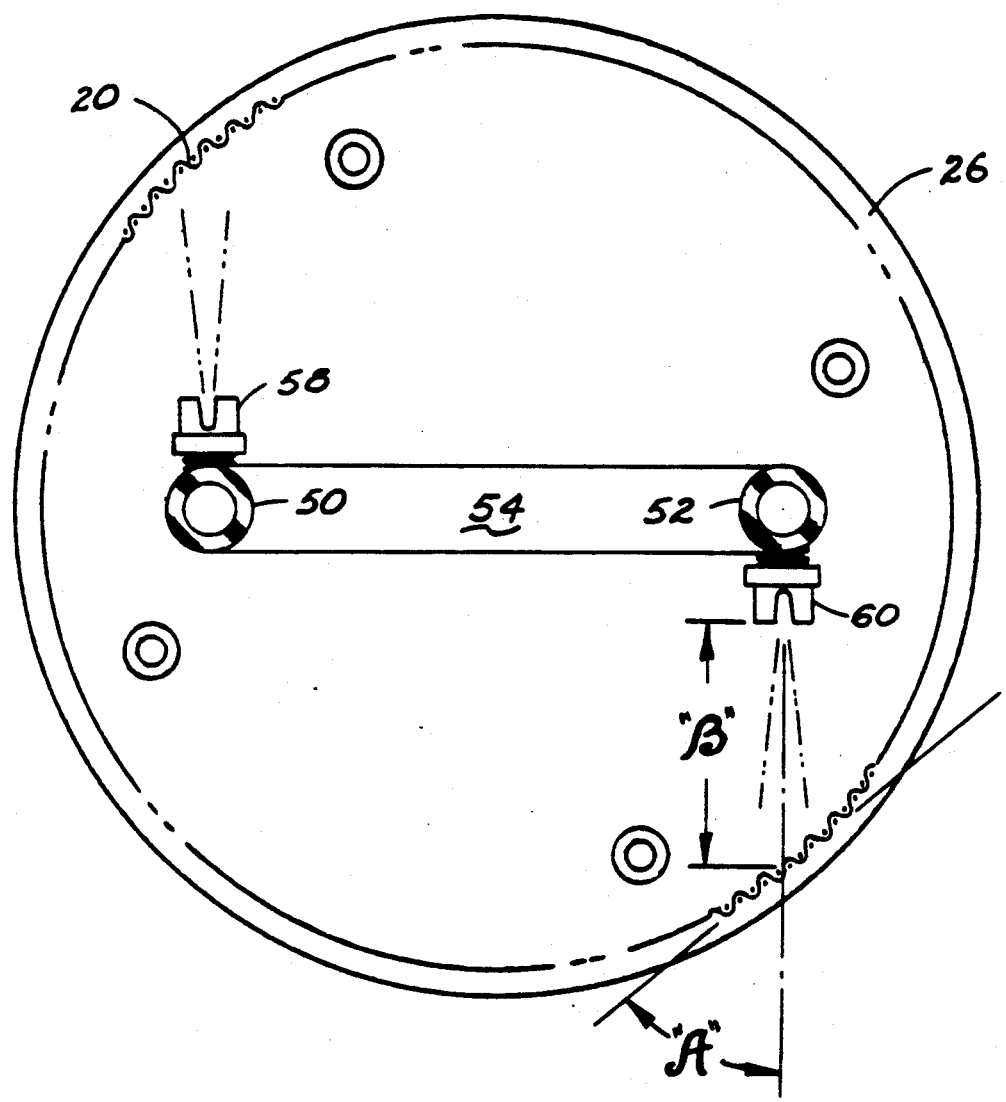
FIG. 5 is a transverse sectional view in the direction of arrows 5—5 in FIG. 4.

As the pump operates to suck water through the strainer and the conduit leading to the suction side of the pump, pressurized water is delivered to assembly 46 via hose 16. Each nozzle 58, 60 emits a wedge, or fan, spray that occupies a somewhat planar zone that is approximately parallel to the strainer's axis. Each spray impinges on the screen over essentially the full axial extent of a corresponding limited circumferential span, the two circumferential spans being located diametrically opposite each other about the strainer's axis. (Although FIG. 5 portrays the screen cross section by using the schematic symbol for a mesh screen, it is to be understood that the preferred screen is a perforated plastic hereinafter described.) Each spray impinges on the screen in a direction which has both a radial component and a circumferential component. The reaction of the screen to the sprays is such that the screen is caused to revolve on body 22 substantially about its own axis. At the same time the sprays are effective to dislodge debris that may have accumulated on the screen's exterior, and in this manner, the screen is kept clean of accumulated debris that might otherwise restrict the ability of the strainer to pass water to the pump. It is to be noted that the pattern of tie rod structures 28 is arranged so as not to interfere with the nozzle sprays.

Figure 6:
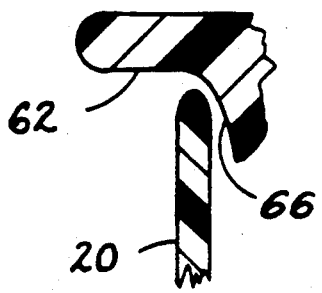
FIG. 6 is an enlarged fragmentary sectional view in circle 6 of FIG. 1.

One of the unique aspects of the invention involves the fact that the outer margins of the two discs 24 and 26 coact with corresponding margins of the axial ends of the screen to guide the rotation of the screen substantially about its own axis. Each disc is constructed to have a corresponding axially facing shoulder 62, 64 respectively, that faces the opposite disc. Immediately interiorly of each shoulder 62, 64 is a corresponding radially facing surface 66, 68 respectively. Screen 20 is dimensioned such that its inside diameter is just slightly larger than the diameters of surfaces 66 and 68, which are themselves identical. Likewise the axial dimension of the screen is selected to be just slightly less than the axial dimension between shoulders 62, 64. In this way the screen can rotate on structure 22 substantially about its own axis with slight amount of radial and axial play that will avoid binding of the rotating screen between the two discs. Preferably, the fit of the screen's margins to those of the discs is shaped in the fashion of FIG. 6 so that any contact of an axial margin of the screen with one of the axially facing shoulders 62, 64 will be minimized. Since the inside diameter of the screen will exceed the diameter of each surface 66, 68, any circumferential contact between the screen margins and surfaces 66, 68 will occur over an extremely limited circumferential extent, theoretically only a single point contact as viewed axially of the strainer. It is also to be observed that screen 20 contains an axial band 70 of perforations that is centrally disposed between two imperforate bands 72, 74. In use, the sprays from the respective nozzles are effective over at least the full axial extent of the perforated band 70.

Figure 7:
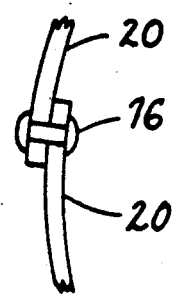
FIG. 7 is an enlarged fragmentary sectional view in the direction of arrows 7—7 in FIG. 1.
Figure 8:
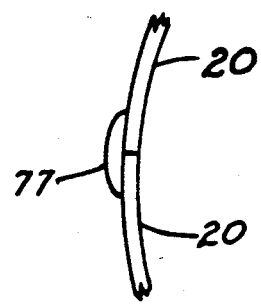
FIG. 8 is a view similar to the view of FIG. 7, but illustrating an alternate construction.

Advantageously, screen 20 can be fabricated from a length of plastic material of suitable width and thickness. The perforations may be imparted to the material by any conventional means of perforating, such as mechanical punches, and the length of material may then be curled into a circular shape. The opposite lengthwise ends of the length of material may be joined either by an overlap joint as portrayed by FIG. 7, or by a butt joint as portrayed by FIG. 8. In the overlap joint of FIG. 7, the overlapping ends are held together by means of rivets 76. In the butt joint of FIG. 8 the ends are united by a joining process. An example of a joining process comprises the insertion of the butted ends into a mold and the injection-molding of suitable plastic material, such as the same material as that of the screen, over the butted ends to create an axial band of injection molded material 77 joining the butted ends. The width of the band circumferentially overlaps each butted end, including passing through underlying perforations, to provide a suitable mechanical joint. The molding is conducted so that the injection molded material does not intrude onto the radially inner face of the screen in a manner that interferes with the rotation of the screen on body 22. While the overlap joint of FIG. 7 may offer a simpler means of securing the ends of the strip to each other, the resultant cylindrical screen cannot be truly circular because of the overlap, only substantially circular. The butt joint of FIG. 8 offers the possibility for a truly circular cylindrical screen, and a truly circular cylindrical screen is preferred over a substantially cylindrical screen. In fact a joint-free truly circular cylindrical screen would seem to be the most desirable, but such a screen is apt to be more expensive than one constructed by the aforedescribed procedures for making the screen from a strip of material.

A still further aspect of the invention involves the use of a material for the screen that will result in the screen having a specific gravity of approximately 1.00 so that the screen is approximately neutrally buoyant when immersed in water. Such approximate neutral buoyancy enhances a tendency toward self-centering of the rotating screen on body 22 which is believed beneficial in promoting the efficient and effective operation of the strainer. An example of an especially good material for the screen is high density polyethylene, whose specific gravity is 0.954. Such material can be obtained from King Plastic Corp., Venice, Fla.

The following details represent an example of a preferred strainer fabricated in accordance with principles of the invention for use with a pump that can suck 60 gallons per minute. Discs 24, 26 are one-half inch thick and about eleven inches in diameter. Screen 20 is three and one-half inches wide and one-eighth inch thick, and is made from a strip of high density polyethylene that is thirty-two and one-quarter inches long. The perforated band 70 is two and one-half inches wide. The perforations are 0.062 inch holes on three thirty-seconds inch staggered centers which provides a 40.5% open area for band 70 containing 131 holes per square inch. While other perforation sizes and patterns are possible, the one just described is believed especially well suited for the intended applications of this new strainer. The axial spacing distance between the discs is selected to provide about one sixteenth inch axial clearance between the margin of the screen and the corresponding axially facing shoulder 62 or 64 when the screen is axially centered between the shoulders. For a perfectly circular cylindrical screen the running clearance between the screen and the surfaces 66 and 68 is also preferably one sixteenth inch uniformly around the screen at each screen/disc interface. The nozzles are one-quarter inch, forty degree spray nozzles of the foregoing named nozzle company, and are supplied with water pressure that is preferably in the range of 15-35 psi, and tube 48 is one-half inch PVC. At 30 psi, the nozzles will flow a total of approximately 2.6 gallons per minute. To attenuate the aging effects of exposure of the plastic parts to ultraviolet radiation, it may be desirable to make them black in color, such as by incorporating lamp black into the plastic material. In order to enhance the ability to visually ascertain screen rotation, a marker, such as a distinguishing color axial band (reference numeral 77 in FIG. 4) may be incorporated into the screen. This axial band could also be the band of injection molded material that joins the butted ends of a strip that is used to fabricate the screen, as described earlier.

Figure 9:
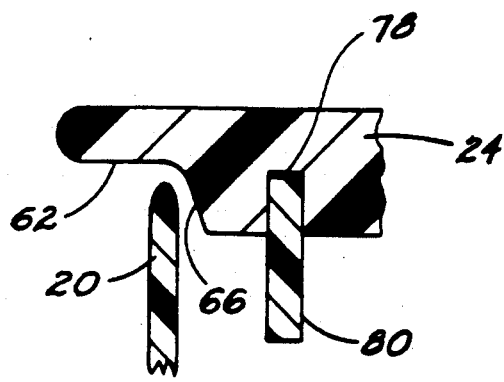
FIG. 9 is a view similar to FIG. 6 illustrating a modification.

While the construction that has been described is capable of preventing undesired intrusion between the axial edges of the screen and the margins of the discs, it has been discovered that the intrusion resistance may possibly be enhanced by the inclusion of a small axial wall just interiorly of each disc/screen interface. An example is shown in FIG. 9 where a circular groove 78 has been created in the interior face of disc 24. The groove is concentric with the disc and has a diameter that places the groove in radially inwardly spaced relation to the margin of the screen, about one-half inch for example. A margin of circular band 80 of plastic, preferably high density polyethylene also, is inserted into and secured to the groove to dispose the opposite margin of the band as a short axial wall interiorly of the screen. A similar construction is also provided in the other disc.

Figure 10:
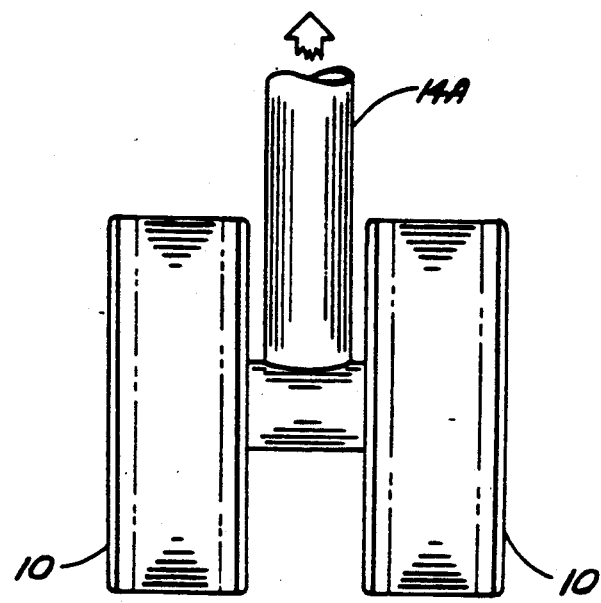
FIG. 10 is a view illustrating another representative usage.

FIG. 10 illustrates usage of multiple strainers 10 in a tandem configuration. The conduit 14A leading to the suction side of the pump is in the form of an inverted T, and there are two strainers connected to the opposite ends of the horizontal portion of the T. The connections of the hoses to the tube assemblies 46 is not illustrated, but is understood to be present.

Figure 11:
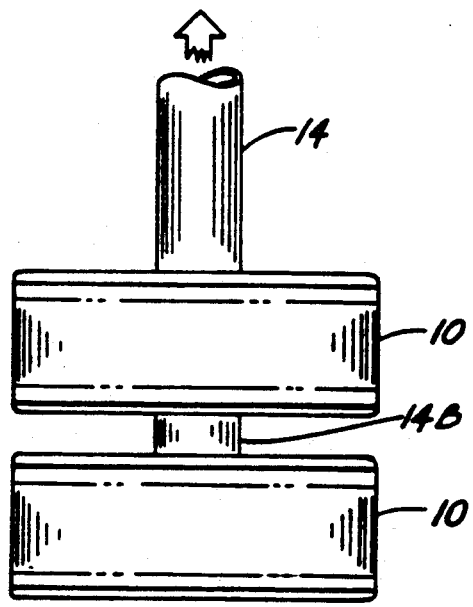
FIG. 11 is a view illustrating yet another representative usage.

FIG. 11 illustrates a usage where a second strainer 10 is connected to a first strainer 10 by an extension conduit 14B. There is a suitable modification made to the bottom disc of the upper strainer 10 for the extension conduit 14B. In the illustrative uses of the invention, the strainer may have a specific gravity greater than one so that it will sink under its own weigh when place in water. On the other hand, it is conceivable, although not probable, that a strainer may have a specific gravity less than one, in which case it would be held submerged under water, such as by being mounted on a rigid conduit that is inserted into the water.

In concluding, it should e mentioned that while the preferred construction for a strainer contemplates that the screen will be approximately neutrally buoyant, precise definition of a preferred range of approximate neutral buoyancy for the screen has not yet been ascertained. Certainly the example that has been described falls within the range. It should also be mentioned that the use of the term screen contemplates an individual screen element such as that shown herein, as well as a screen assembly fabricated from multiple parts assembled together. Using conventional principles of design, it is possible to construct a multiple part screen that can be approximately neutrally buoyant even though some of the parts have specific gravity substantially greater than 1.0. For example, such an assembly could comprise a stainless steel screen (specific gravity greater than 1.0) to the axial ends of which suitably sized circular bands are assembled. These bands are of a material that has a lower specific gravity and will therefore compensate for the higher specific gravity of a stainless steel screen. Other variations on the examples that have been herein disclosed are fully contemplated by the invention principles herein disclosed and fall within the scope of the following claims.

What is claimed is:

1. A rotary self-cleaning strainer for connection to the suction side of a pump and immersion in debris-containing liquid to prevent debris in the liquid from being sucked along with the liquid into the pump, said strainer comprising a cylindrical screen structure for straining debris from the liquid, means capturing and supporting said screen structure for rotation substantially about its own axis comprising first and second closure means disposed respectively at opposite axial ends of the screen structure, said first closure means comprising a first disc and said second closure means comprising a second disc, each disc having an annular marginal surface portion coacting both axially and radially with an annular marginal surface portion of the corresponding axial end of the screen structure, and said annular marginal surface portions of said discs coacting with said annular marginal surface portions of the axial ends of said screen structure to axially and radially capture and to guide the rotation of said screen structure substantially about its own axis such that said screen structure can rotate with slight radial and axial play to avoid binding on said discs, a flow path through said first disc for communicating space bounded by said screen structure to the suction side of such a pump so that when the strainer is immersed in debris-containing liquid and the pump is operated, liquid will be drawn through said screen structure into said space and thereafter conveyed to the pump, and a supply conduit through one of said discs into said space to deliver pressurized fluid to nozzles means which are disposed in said space and via which the pressurized fluid is emitted toward said screen structure to both rotate said screen structure and dislodge debris from said screen structure.

2. A rotary self-cleaning strainer as set forth in claim 1 in which said annular marginal surface portions of said discs each comprises an axially facing surface that radially overlaps the annular marginal surface portion of the corresponding axial end of said screen structure, and an adjoining radially outwardly facing surface that is disposed radially inwardly thereof and that axially overlaps the annular marginal surface portion of the corresponding axial end of said screen structure.

3. A rotary self-cleaning strainer as set forth in claim 2 in which said discs are respective high density polyethylene discs, and wherein said screen structure is a cylindrical annular member also of high density polyethylene.

4. A rotary self-cleaning strainer as set forth in claim 3 in which said member comprises a central axial zone of perforations bounded axially by non-perforated marginal zones.

5. A rotary self-cleaning strainer as set forth in claim 1 in which said first disc is said one disc so that said flow path and said supply conduit pass through the same disc.

6. A rotary self-cleaning strainer as set forth in claim 1 in which said nozzle means comprises at least one nozzle that is aimed at said screen structure such that an extension of the axis of said at least one nozzle intersects said screen structure at a location where a tangent to the screen structure at said intersection makes an angle of substantially forth-eight to fifty degrees, as measured exteriorly of the screen structure between said extension and said tangent in the direction that the screen structure is rotated by the liquid emitted from said at least one nozzle.

7. A rotary self-cleaning strainer as set forth in claim 1 in which said screen structure is approximately neutrally buoyant when the strainer is immersed in the debris-containing liquid.

8. A rotary self-cleaning strainer as set forth in claim 1 in which said supply conduit comprises a U-shaped tube assembly mounted on said one disc, said U-shaped tube assembly having axial segments passing through said one disc and a diametral segment disposed within said space and extending between said axial segments, said nozzle means comprising a pair of nozzles each of which is disposed on a corresponding one of said axial segments and which are aimed toward said screen structure in generally parallel planes, but in opposite directions.

9. A rotary self-cleaning strainer as set forth in claim 1 in which said nozzle means comprises at least one nozzle that is aimed at said screen structure such that an extension of the axis of said at least one nozzle intersects said screen at a location where a tangent to the screen structure at said intersection makes an angle of substantially forty-eight to fifty degrees, as measured exteriorly of the screen structure between said extension and said tangent in the direction that the screen structure is rotated by the liquid emitted from said at least one nozzle, and in which the distance from the tip end of said at least one nozzle to said screen structure as measured along said extension is substantially two inches.

10. A rotary self-cleaning strainer for connection to the suction side of a pump and immersion in debris-containing liquid to prevent debris in the liquid from being sucked along with the liquid into the pump, said strainer comprising a cylindrical screen structure for straining debris from the liquid, means capturing and supporting said screen structure for rotation substantially about its own axis comprising first and second closure means disposed respectively at opposite axial ends of the screen structure, each closure means having an annular marginal portion coacting with an annular margin of the corresponding axial end of the screen structure, and said annular marginal portions of said closure means coacting with said annular marginal portions of the axial ends of said screen structure to guide the rotation of said screen structure substantially about its own axis such that said screen structure can rotate with slight radial and axial play to avoid binding on said closure means, a flow path through said first closure means for communicating space bounded by said screen structure to the suction side of such a pump so that when the strainer is immersed in debris-containing liquid and the pump is operated, liquid will be drawn through said screen structure into said space and thereafter conveyed to the pump and a supply conduit through one of said closure means into said space to deliver pressurized fluid to nozzles means which are disposed in said space and via which the pressurized fluid is emitted toward said screen structure to both rotate said screen structure and dislodge debris from said screen structure, and in which said screen structure is approximately neutrally buoyant when the strainer is immersed in the debris-containing liquid.

11. A rotary self-cleaning strainer as set forth in claim 10 in which the specific gravity of said screen structure is approximately one.

12. A rotary self-cleaning strainer as set forth in claim 11 in which said screen structure comprises a plastic screen having a specific gravity slightly less than one.

13. A rotary self-cleaning strainer as set forth in claim 12 in which said screen comprises a circularly curled strip of such plastic.

14. A rotary self-cleaning strainer as set forth in claim 13 in which opposite ends of said strip have a butt-type joint.

15. A rotary self-cleaning strainer as set forth in claim 14 in which the opposite ends of said strip are joined by material that has been injection molded thereon, including injection molded through perforations in said plastic screen.

16. A rotary self-cleaning strainer as set forth in claim 15 in which said injection molded material forms an axial band that is visibly distinguished from the rest of the screen to provide a visible means for indication of rotation of the screen.

17. A rotary self-cleaning strainer as set forth in claim 13 in which opposite ends of said strip have an overlap-type joint.

18. A rotary self-cleaning strainer as set forth in claim 12 in which said strip comprises a central axial zone of perforations bounded axially by non-perforated marginal zones.

19. A rotary self-cleaning strainer for connection to the suction side of a pump and immersion in debris-containing liquid to prevent debris in the liquid from being sucked along with the liquid into the pump, said strainer comprising a cylindrical screen structure for straining debris from the liquid, means capturing and supporting said screen structure for rotation substantially about its own axis comprising first and second closure means disposed respectively at opposite axial ends of the screen structure, each closure means having an annular marginal portion coacting with an annular margin of the corresponding axial end of the screen structure, and said annular marginal portions of said closure means coacting with said annular marginal portions of the axial ends of said screen structure to guide the rotation of said screen structure substantially about its own axis such that said screen structure can rotate with slight radial and axial play to avoid binding on said closure means, a flow path through said first closure means for communicating space bounded by said screen structure to the suction side of such a pump so that when the strainer is immersed in debris-containing liquid and the pump is operated, liquid will be drawn through said screen structure into said space and thereafter conveyed to the pump, and a supply conduit through one of said closure means into said space to deliver pressurized fluid to nozzles means which are disposed in said space and via which the pressurized fluid is emitted toward said screen structure to both rotate said screen structure and dislodge debris from said screen structure, and in which said supply conduit comprises a U-shaped tube assembly mounted on said one closure means, said U-shaped tube assembly having axial segments passing through said one closure means and a diametral segment disposed within said space and extending between said axial segments, said nozzle means comprising a pair of nozzles each of which is disposed on a corresponding one of said axial segments and which are aimed toward said screen structure in generally parallel planes, but in opposite directions.

20. A rotary self-cleaning strainer as set forth in claim 19 in which the specific gravity of said screen structure is approximately one.

21. A rotary self-cleaning strainer as set forth in claim 20 in which said annular marginal portions of said first and second closure means each comprises an axially facing surface that radially overlaps the annular marginal portion of the corresponding axial end of said screen structure, and an adjoining radially outwardly facing surface that is disposed radially inwardly thereof and that axially overlaps the annular marginal portion of the corresponding axial end of said screen structure.

22. A rotary self-cleaning strainer for connection to the suction side of a pump and immersion in debris-containing liquid to prevent debris in the liquid from being sucked along with the liquid into the pump, said strainer comprising a cylindrical screen structure for straining debris from the liquid, means capturing and supporting said screen structure for rotation substantially about its own axis comprising a first and second closure means disposed respectively at opposite axial ends of the screen structure, each closure means having an annular marginal portion coacting with an annular margin of the corresponding axial end of the screen structure, and said annular marginal portions of said closure means coacting with said annular marginal portions of the axial ends of said screen structure to guide the rotation of said screen structure substantially about its own axis such that said screen structure can rotate with slight radial and axial play to avoid binding on said closure means, a flow path through said first closure means for communicating space bounded by said screen structure to the suction side of such a pump so that when the strainer is immersed in debris-containing liquid and the pump is operated, liquid will be drawn through said screen structure into said space and thereafter conveyed to the pump, and a supply conduit through one of said closure means into said space to deliver pressurized fluid to nozzles means which are disposed in said space and via which the pressurized fluid is emitted toward said screen structure to both rotate said screen structure and dislodge debris from said screen structure, and in which said nozzle means comprises at least one nozzle that is aimed at said screen structure such that an extension of the axis of said at least one nozzle intersects said screen structure at a location where a tangent to the screen structure at said intersection makes an angle of substantially forty-eight to fifty degrees, as measured exteriorly of the screen structure between said extension and said tangent in the direction that the screen structure is rotated by the liquid emitted from said at least one nozzle, and in which the distance from the tip end of said at least one nozzle to said screen structure as measured along said extension is substantially two inches.

* * * * *